Jan. 13, 1970   H. J. FORTUNE ETAL   3,489,418
RECORD CHANGER
Filed March 7, 1967   7 Sheets-Sheet 1

INVENTORS
HENRY JAMES FORTUNE
EDWARD WILLIAM JOHN CADDY
BY
ATTORNEYS

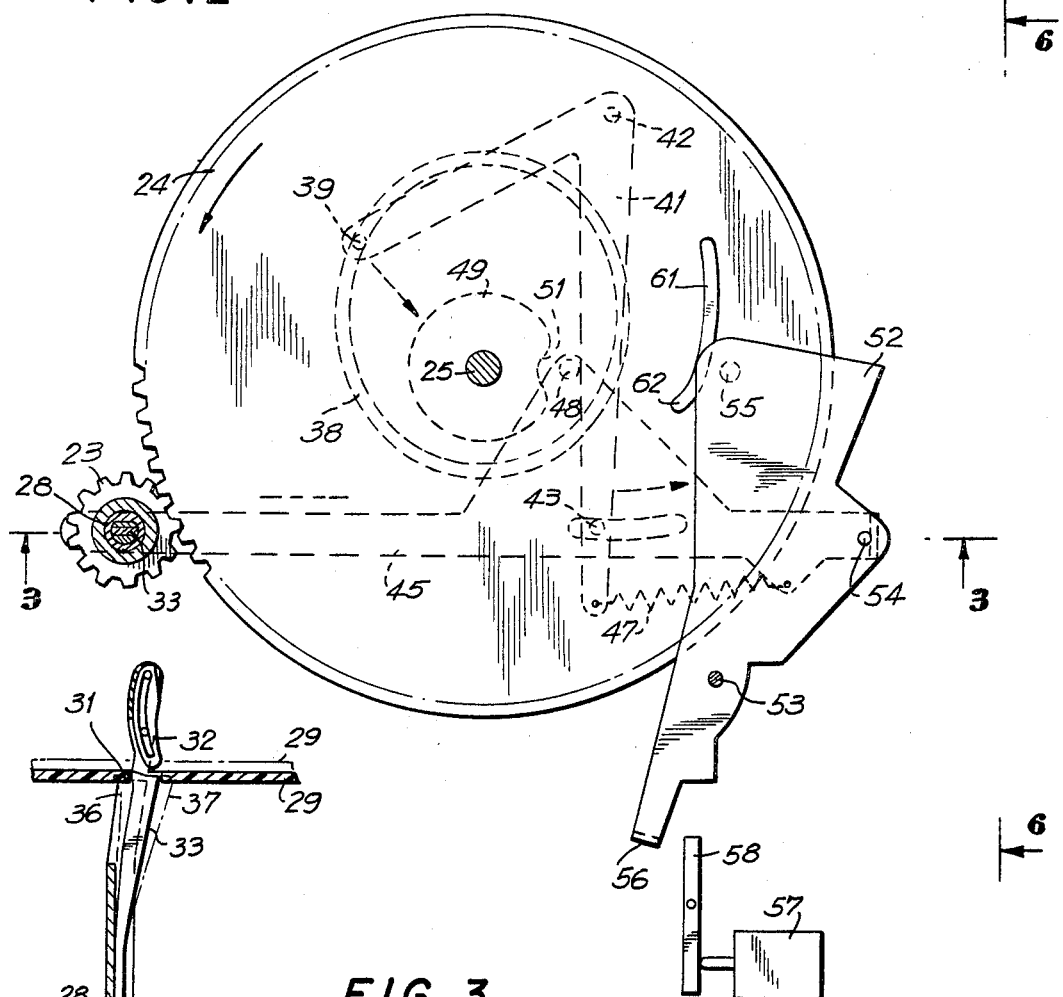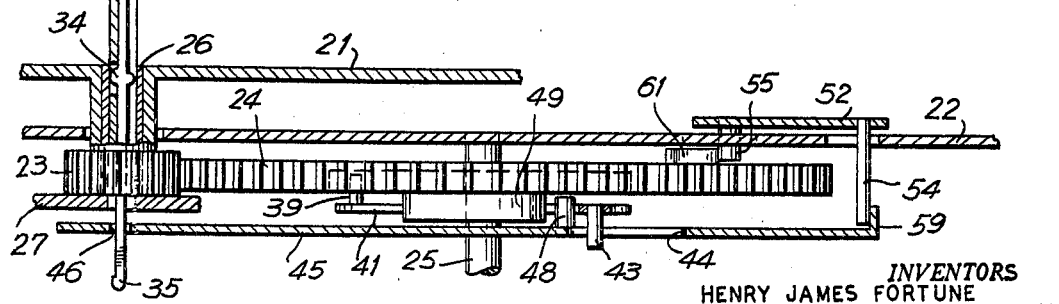

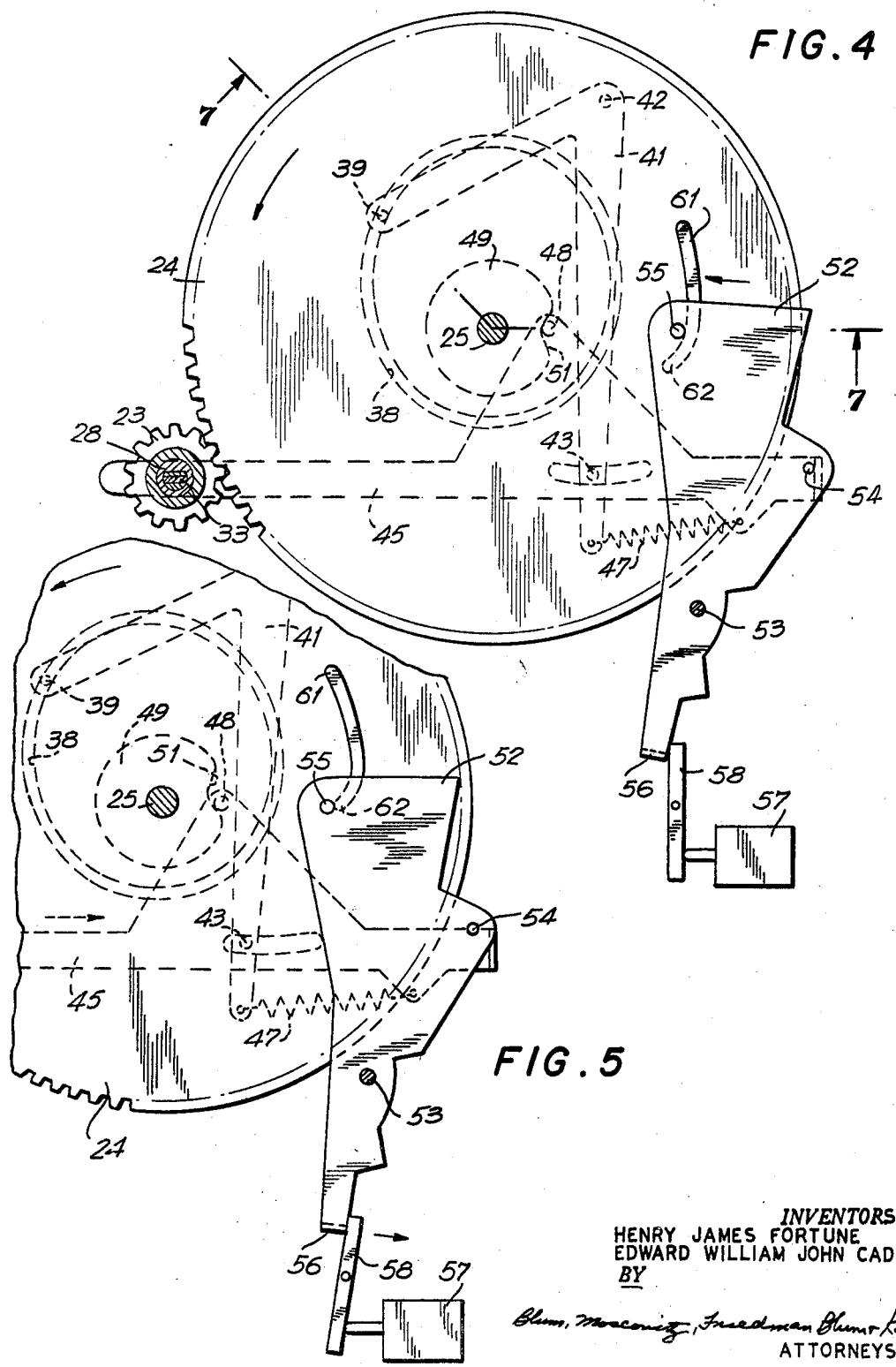

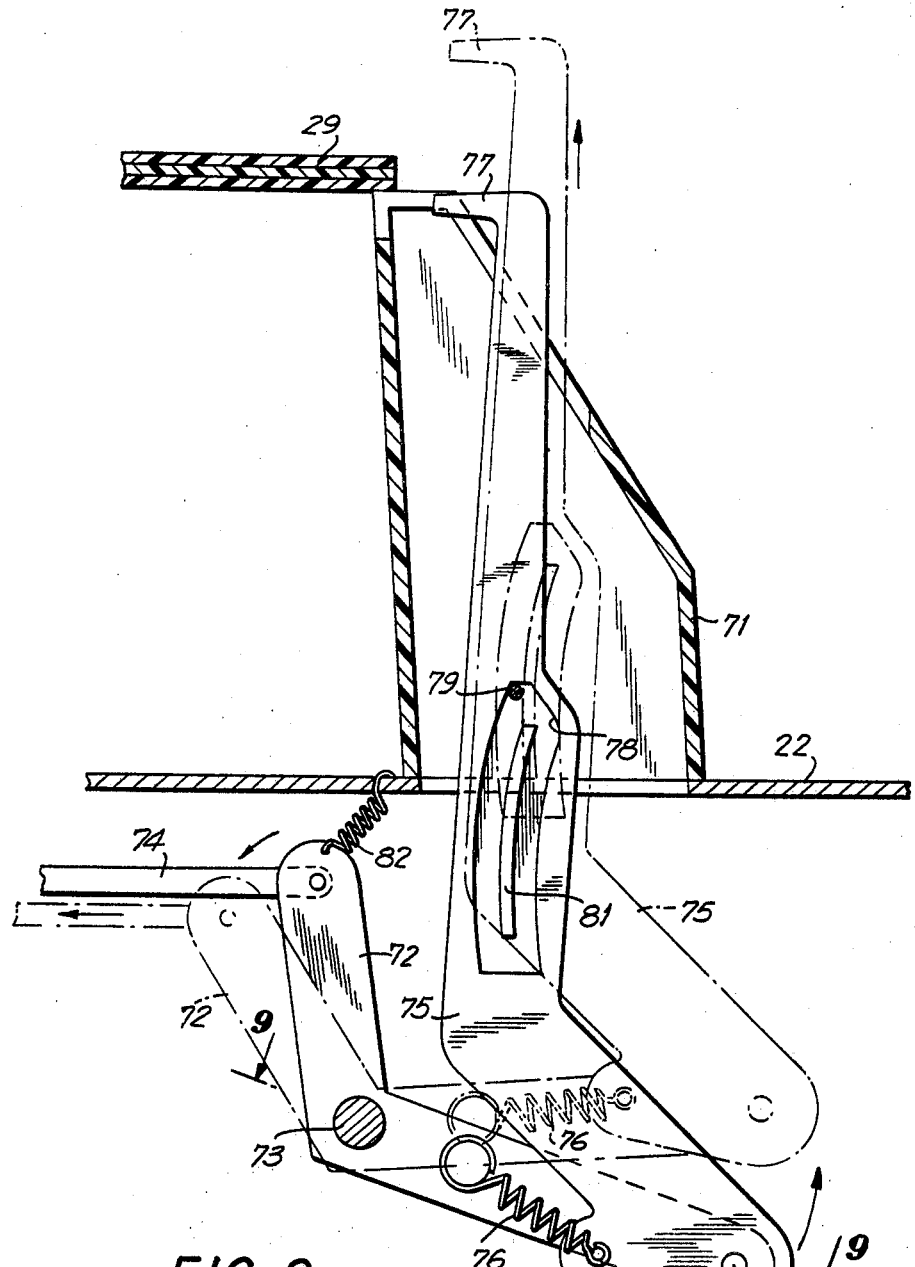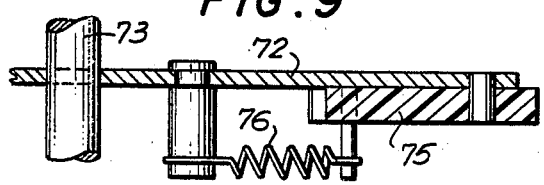

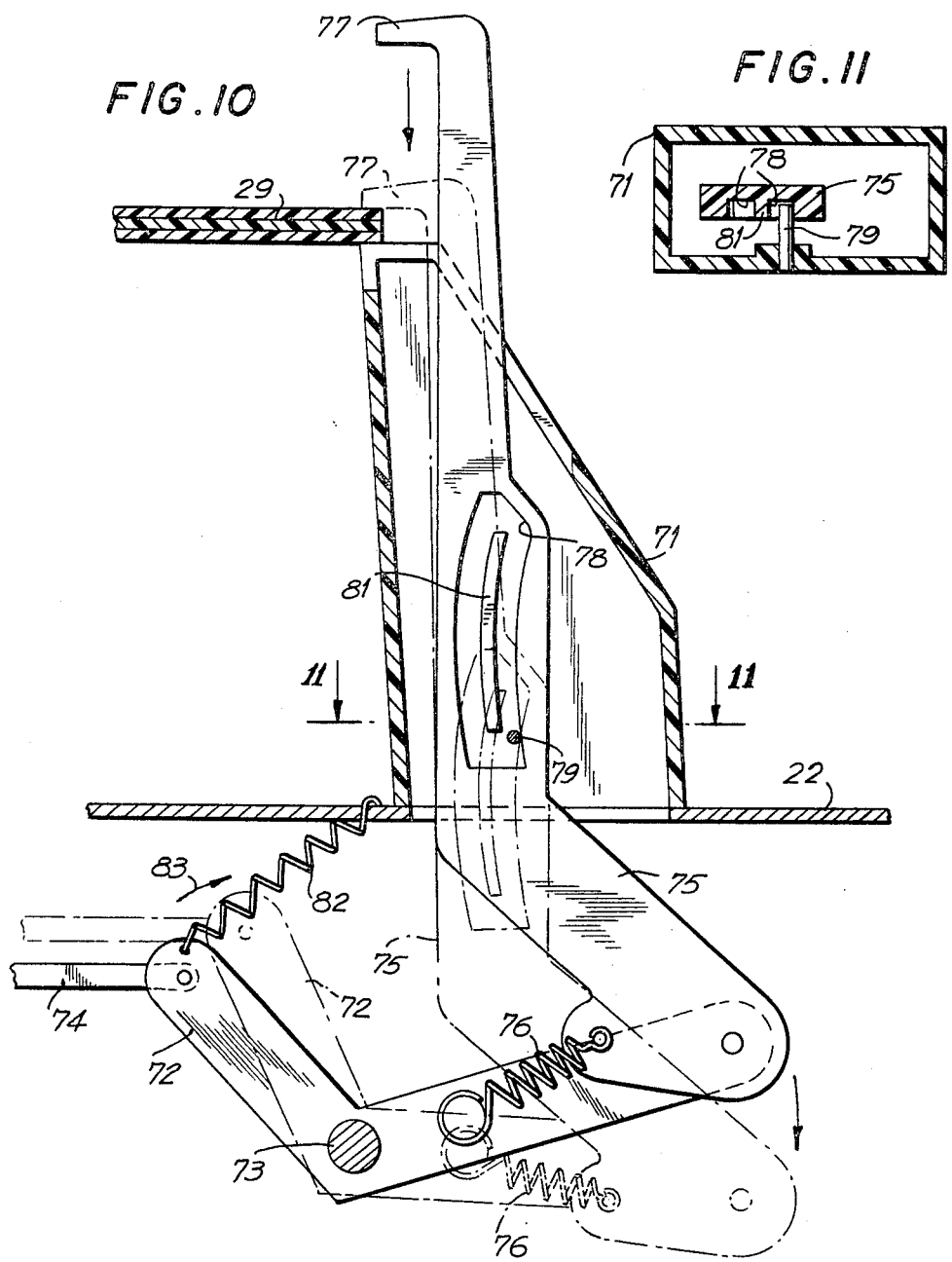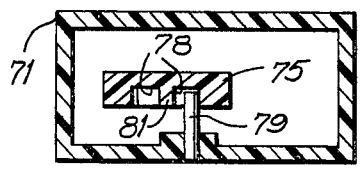

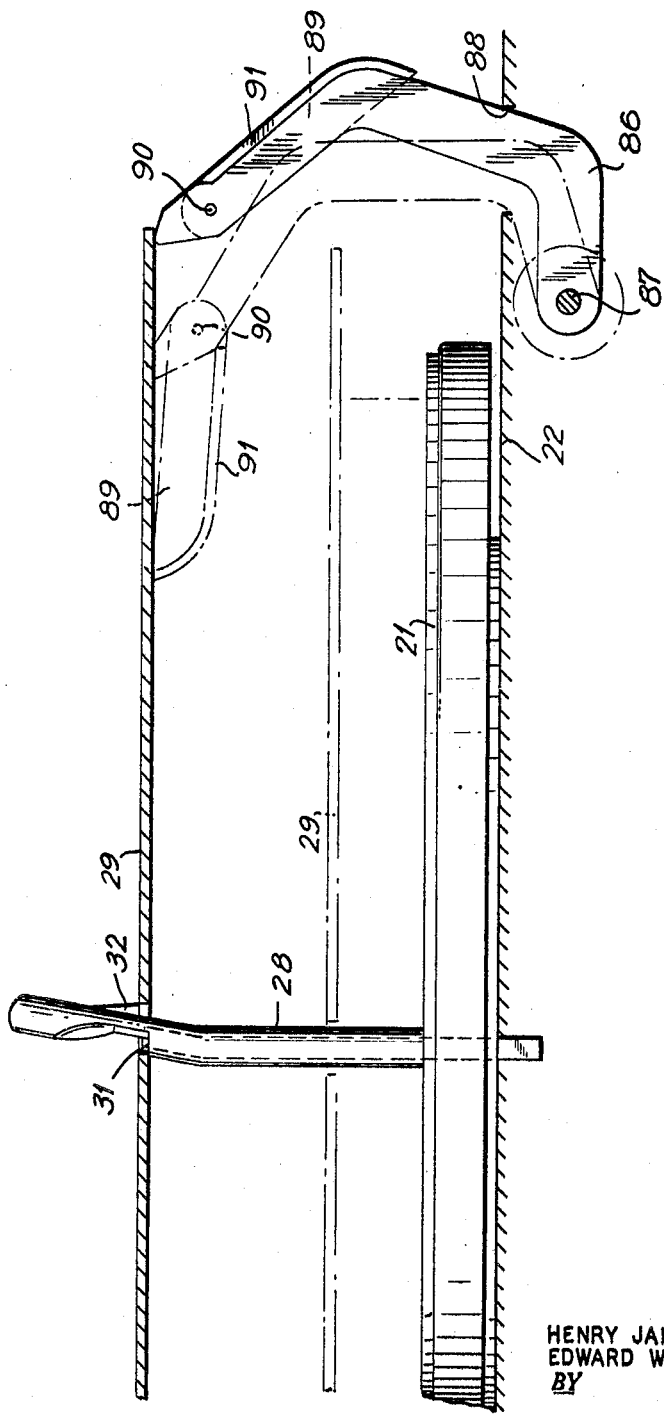

INVENTORS
HENRY JAMES FORTUNE
EDWARD WILLIAM JOHN CADDY
BY
ATTORNEYS

United States Patent Office
3,489,418
Patented Jan. 13, 1970

3,489,418
RECORD CHANGER
Henry James Fortune and Edward William John Caddy, Swindon, England, assignors to Garrard Engineering Limited, Swindon, Wiltshire, England, a British company
Filed Mar. 7, 1967, Ser. No. 621,187
Claims priority, application Great Britain, Mar. 15, 1966, 11,396/66; Mar. 21, 1966, 12,349/66, 12,350/66
Int. Cl. G11b 15/00
U.S. Cl. 274—10     11 Claims

ABSTRACT OF THE DISCLOSURE

A record changer with a center spindle for supporting and dropping records in sequence with a mechanism within the center support for sensing the presence or absence of a record for controlling an automatic shut-off mechanism. With the center support for dropping and sensing the records, there is also provided an edge support for the sole purpose of balancing the records. The tone arm is also balanced by a counterweight which is resiliently supported from the tone arm in all directions of relative movement between the tone arm and the counterweight.

BACKGROUND OF THE INVENTION

This invention relates generally to an automatic record changer which automatically drops records in sequence and which senses the dropping of the final record in order to condition the record changer for automatic shut-off after play of the last record. While automatic shut-off in record changers is known in the art, many prior art mechanisms which utilize a center spindle for dropping of the records also utilizes an overarm extending over and resting on the record stack for sensing the dropping of the last record. In some prior art mechanisms, the center support has been utilized for sensing the dropping of the last record but in such mechanisms the records have generally been moved to dropping position by an edge support mechanism. In the aforesaid prior art arrangements, it has usually been necessary to provide complex center support and edge support mechanisms.

It is also known to counterbalance the tone arm in a record changer or turntable but in most prior art arrangements the counterweight has not been resiliently supported from the tone arm.

SUMMARY OF THE INVENTION

Generally speaking, in accordance with the invention, a center support is provided including a mechanism which drops the lowermost record on the stack onto the turntable at each record change cycle and also senses whether or not one or more records remain stacked on the center support. When the sensing mechanism senses that the last record has dropped onto the turntable, it conditions the record player for shut-off at the end of record play.

Since the dropping and sensing mechanism form part of the center support, an edge support is provided for the sole purpose of balancing the stack of records. The edge support may be adjustable to support and balance the edges of records of various sizes.

The invention also provides for means for supporting a counterweight on a record player tone arm whereby the counterweight is resiliently supported in all directions of relative movement between the tone arm and the counterweight.

It is an object of this invention to provide a record changer with improved center support means for dropping records in sequence and sensing the presence or absence of records on the center support means.

A further object of the invention is to provide, in a record player wherein dropping and sensing is accomplished by center support means, an improved edge support for supporting the record edge and balancing the records.

Another object of the invention is to provide record edge support means which may be adjusted to support and balance records of various sizes.

Still another object of the invention is to provide means for resiliently supporting a counterweight in all directions of relative movement between a tone arm and the counterweight.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a top plan view, partly in section, of the mechanism of FIG. 1;

FIG. 3 is a partial sectional view taken along line 3—3 of FIG. 2;

FIG. 4 is a view similar to FIG. 2 showing the mechanism in the position of sensing the absence of records on the support spindle;

FIG. 5 is a partial view similar to FIG. 4 showing the mechanism approaching shut-off position;

FIG. 8 is a partial elevational view of an edge support mechanism constructed in accordance with a preferred embodiment of the instant invention;

FIG. 9 is a partial sectional view taken along line 9—9 of FIG. 8;

FIG. 10 is a view similar to FIG. 8, showing the mechanism in alternate positions;

FIG. 11 is a partial sectional view taken along line 11—11 of FIG. 10;

FIG. 12 is a partial elevational view of a construction of an adjustable edge support mechanism;

DESCRIPTION OF THE PREFERRED EMBODIMENTS

Figure 1:
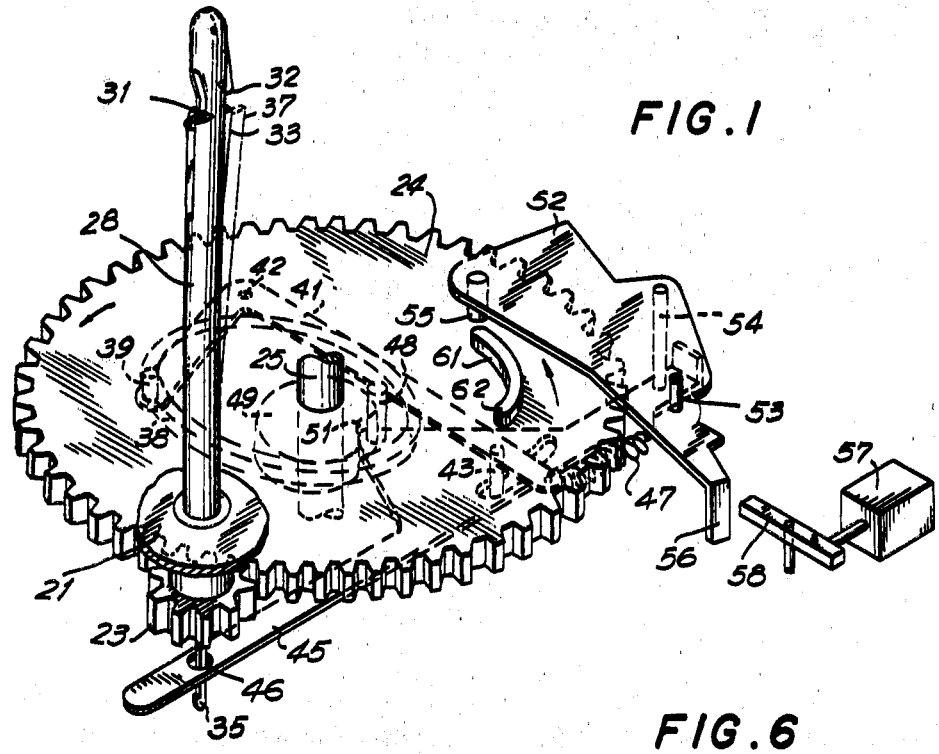
FIG. 1 is a partial perspective view of an improved record changing and sensing mechanism constructed in accordance with the invention.
Figure 6:
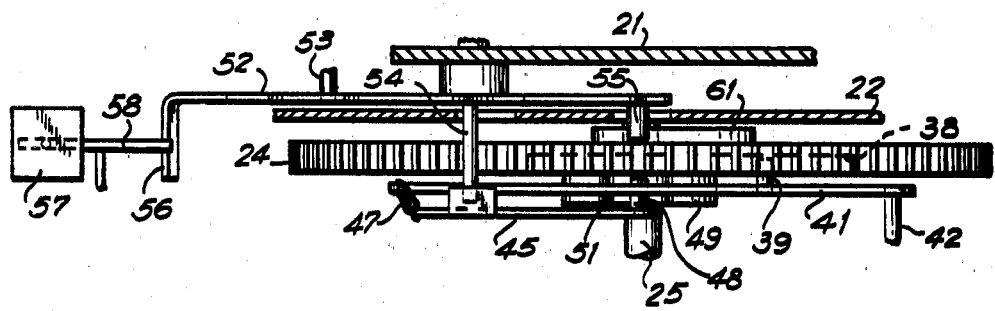
FIG. 6 is a view looking in the direction of arrows 6—6 on FIG. 2.
Figure 7:
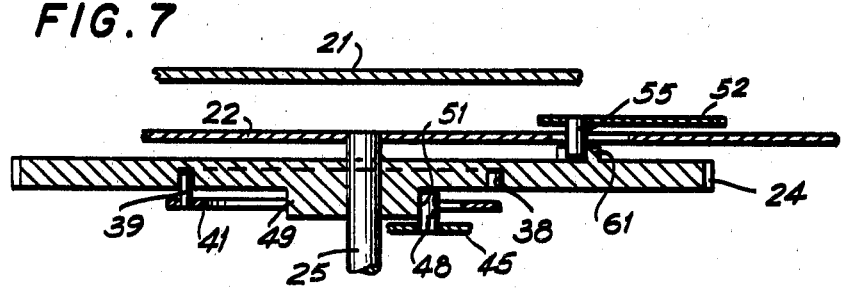
FIG. 7 is a partial sectional view taken along line 7—7 of FIG. 4.

Referring now to FIGS. 1 through 7, a turntable 21 is rotatably mounted on a frame 22 in the usual fashion and is driven by a motor and rim drive (not shown) as is well known in the art. The turntable carries a drive gear 23 for rotating a gear wheel 24 rotatably mounted on the frame through a pivot pin 25. Gear wheel 24 controls the record changing action and such gear wheels are well known in the record changer art. Such gear wheels are discontinuous at a point along the periphery and include a start mechanism for commencing rotation of the gear wheel at the start of each record change cycle while the turntable and drive gear rotate continuously. The start mechanism is not shown since it may be of any known type and does not constitute a part of the invention herein. A description thereof is not deemed necessary for a complete understanding of the instant invention.

A tube 26 is fixedly supported to a frame element 27 and extends upwardly centrally of the turntable. A center spindle 28 is received in tube 26 for supporting records 29 thereon. The center spindle has a shelf 31 for supporting the records at the center hole and a sliding plate 32 for limiting the dropping of the records to a single record at a time. This type of arrangement is well known in the art. A rockable blade 33 is rockably mounted within center spindle 28 and is provided with cam projections 34 which engage with the walls of tube 26 to provide a pivot for the rockable blade. The rockable blade extends slightly above shelf 31 with the normal or central position being shown in full lines in FIG. 3. The rockable blade has a lower end 35 through which the blade is actuated. Rockable blades of this general type are also known in the art wherein during a change cycle the rockable blade is moved from the central position to phantom line position 36 to slide, through cooperation with the center hole, the lowermost record off shelf 31 and permit it to drop onto the turntable whereafter the rockable blade returns to the full line position.

Sensing is also accomplished by rockable blade 33 as will hereafter be described in greater detail. Briefly, at the termination of each change cycle the mechanism operating the rockable blade attempts to move beyond the central position to phantom line position 37. If a record 29 is located on shelf 31, movement to phantom line position 37 will be prevented thereby sensing that at least one more record remains on the center spindle. On the other hand, if the last record has dropped the rockable blade is permitted to move to the phantom line position 37 thereby sensing that there are no more records on the center spindle to condition the operating mechanism for shut-off upon completion of play of the last record.

The mechanism for operating rockable blade 33 is located below frame 22. The lower surface of gear wheel 24 is provided with an elliptical cam track 38 in which rides a pin 39 projecting upwardly from one end of a bell crank 41 pivoted to the frame at 42. On initiation of a change cycle, gear wheel 24 is rotated through drive gear 23 in a counterclockwise direction as viewed in FIGS. 1 and 2 to pivot bellcrank 41 in a counterclockwise direction by cooperation between pin 39 and cam track 38. The other arm of bell crank 41 is provided with a downwardly projecting pin 43 which extends through a slot 44 in a plate 45. Plate 45, as best shown in FIG. 3, is slidably mounted below the frame and includes an aperture 46 through which the lower end 35 of the rocking blade extends. Plate 45 is the element which actually causes movement of the rocking blade. Plate 45 is mounted for free sliding movement and is spring biased to bell crank 41 through a spring 47.

As stated above, at the commencement of a change cycle, bell crank 41 moves in a counterclockwise direction about pivot 42 and pin 43 engages the edge of slot 44 to move plate 45 to the right as viewed in FIGS. 2 and 3. Through aperture 46, lower end 35 of the rockable plate is caused to move to the right thereby rocking the rockable plate about cams 34 to move the rockable blade to the phantom line position 36 to effect dropping of a record.

After the record has been dropped, continued counterclockwise rotation of gear wheel 24 causes bell crank 41 to rotate in a clockwise direction and, through spring 47, return plate 45 to its normal position which corresponds to the full line position of rockable blade 33 in FIG. 3. Continued clockwise movement of bell crank 41 tends to move plate 45 to the left but this is limited by a pin 48 which projects upwardly from plate 45 and is disposed opposite a second cam track 49 on the gear wheel. The second cam track is provided with an indent portion 51 into which pin 48 tends to ride thereby biasing plate 45 further toward the left and tending to rock rockable blade 33 toward phantom line position 37. However, if at least one record still rests on shelf 31, the right edge of rockable blade 31 is blocked by the edge of the center hole of the record and is unable to move to phantom line position 37. This prevents movement toward the left of plate 45 and prevents the movement of pin 48 into indent portion 51 and this occurrence at this part of the cycle is indicated in FIG. 2.

A switch plate 52 is pivoted to the frame at 53 and carries a first downwardly projecting pin 54 and a second downwardly projecting pin 55. An end 56 of the switch plate is adapted to control the shut-off of a switch 57 which is being held depressed in the FIG. 2 position by a lever 58. The switch and lever are shown schematically since release of switches and levers are known in the record changer art. The normal position of switch plate 52 for continuous changing of the record at the end of each record play is shown in FIG. 2 and it will be noted that pin 54 is proximate an upturned end 59 of plate 45 while pin 55 is located on the outside of a cam 61 mounted to gear wheel 24. During the aforesaid described change cycle wherein at least one record remains on the center spindle, continued movement to the left of plate 45 was prevented by the sensing action of rockable blade 33 and thus pin 48 was held away from indent portion 51 to prevent upturned end 59 from acting on switch plate 52 through pin 54 and thus as the gear wheel continues to turn, cam 61 passes inside of pin 55 and the change cycle is completed without further movement of plate 45 or switch plate 52.

Had there been no record on the center spindle, rockable blade 33 could have moved to the phantom line position 37 by continued movement toward the left of plate 45 whereby pin 48 would move into indent portion 51 allowing substantial movement to the left of plate 45. This movement causes upturned end 59 to engage and move pin 54 thereby rotating switch plate 52 in a counterclockwise direction about pivot 53 and moving pin 55 toward cam 61 to condition switch plate 52 to effect shut-off at the next change cycle.

The next change cycle occurs on completion of play of the last record. The operation is as previously described except that, with switch plate 52 moved inwardly as shown in FIG. 4, pin 55 is positioned to move inside of cam 61 which has moved end 56 of the switch plate into engagement with lever 58, also as shown in FIG. 4. With continued movement of the gear wheel, the angled end 62 of cam 61 cooperates with pin 55 to rotate switch plate 52 in the counterclockwise direction thereby driving end 56 against lever 58 to effect switch shut-off. The final driving action to the shut-off position occurs just as the record change cycle is completed whereby the entire mechanism comes to rest.

As can now be seen, the positioning of switch plate 52 determines whether or not the record changer will shut off at the end of record play. With switch plate 52 in the FIG. 2 position whereby pin 55 is outside of cam 61, the record changer will cycle normally at the end of record play and shut-off will not occur. When the last record has dropped and plate 45 is permitted to move fully to the left during the dropping of the last record, switch plate 52 is permitted to move slightly in a counterclockwise direction bringing pin 55 to a position whereby, on the next change cycle it will be located inside of cam 61 which can thereafter positively drive the switch plate to the shut-off position.

With the foregoing center spindle support for a stack of records, it is necessary, in order for proper balance of the records, to provide edge support means therefor. A preferred arrangement of such edge support means is shown in FIGS. 8 through 11. A support bracket 71 is mounted on frame 22 and located with respect to the center spindle so as to support the stack of records at the edge thereof. A bell crank 72 is pivoted intermediate its ends at a fixed pivot 73 and one end is pivotally connected to an actuating lever 74 which is connected to any known type of on-off-reject lever (not shown). To the other end of bell crank 72 is pivoted an end of a hold-down arm 75. A spring 76 connected between the hold-down arm and bell crank 72 biases the hold-down arm away from the center spindle in the rest-no record position shown in full lines in FIG. 8. The other end of hold-down arm 75 is provided with an inwardly extending extension 77 which rests on and balances the records as will be hereafter described. As shown in FIGS. 8, 10 and 11, hold-down arm 75 is provided with a closed circuit cam path 78 which cooperates with a follower pin 79 fixedly supported in support bracket 71. In the center of cam path 78 is a projection 81 whereby the cam path is divided into what may be effectively termed as a closed circuit track.

As stated above, the rest position of hold-down arm 75 is shown in full lines in FIG. 8. On actuation of lever 74, the lever is pulled to the left (FIG. 8) to rotate bell crank 72 about fixed pivot 73. This causes hold-down arm 75 to be raised toward the phantom line position of FIG. 8 during which the point of connection of spring 76 to the hold-down arm moves above a line drawn between fixed pivot 73 and the pivot of the hold-down arm to bell crank 72 to cause spring 76 to bias the hold-down arm toward the center spindle. The inward movement of the hold-down arm is limited by engagement of projection 81 with follower pin 79 as shown in phantom lines in FIG. 8 and thus the hold-down arm is held away from the records until it attains its full height whereupon the follower pin clears projection 81 and the hold-down arm moves inwardly toward the records to the full line position of FIG. 10.

A spring 82 connected between bell crank 72 and the frame biases the crank in the clockwise direction which in turn biases the hold-down arm downwardly. When the hold-down arm has attained its full height and the pull on lever 74 is released, the biasing of bell crank 72 in the direction of arrow 83 in FIG. 10 pulls the hold-down arm downwardly until it rests on the topmost record of the stack. As records drop off the center spindle, the biasing arrangement causes the hold-down arm to move downwardly as the height of the stack decreases to prevent tipping of the record stack. When the hold-down arm has moved inwardly toward the record stack, follower pin 79 becomes located at the rear portion of cam path 78 on the opposite side of projection 81 thereby preventing the hold-down arm from moving away from the records as shown in phantom lines in FIG. 10 until the hold-down arm has moved to the fully down position when all records are off the support bracket whereupon the hold-down arm springs to the rest position shown in full lines in FIG. 8.

From the foregoing, it is clear that the edge support bracket and hold-down arm serve merely to aid in the support and balance of the records and perform no sensing function whatever. Referring again to FIG. 3, it is noted that the upper end of center spindle 28 is slightly inclined and this inclination is toward the support bracket whereby, as each record drops, it is moved off the support bracket by the rockable blade and guided away from the support bracket by the inclination of the center spindle.

The aforesaid described support bracket envisions use with the records of a pre-selected diameter. If, however, it is desired to provide edge support for records of several diameters, an edge support arrangement as shown in FIG. 12 may be utilized. An arm 86 is pivoted at one end to the frame by means of a pin 87 with the pivot arrangement being sufficiently tight to frictionally hold the arm in any preset position. Frame 22 may be provided with a slot 88 through which the arm extends to limit the movement of the arm to define two arm positions. One is shown in full lines in FIG. 12 wherein the free end of arm 86 is positioned so as to be engaged by an edge of a 12″ record, for example, for balancing and supporting the edge of the record. Arm 86 may be rotated to the phantom line position of FIG. 12 to support a 10″ record (for example) with the arm frictionally held in the phantom line position and with the position of the arm being determined by engagement of the arm with slot 88.

For even smaller records, an arm 89 is pivoted at 90 to the free end of arm 86 and normally remains in the full line folded position. Arm 89 has a projection 91 which gives it an L-shaped cross section with the projection lying along the upper portion of arm 86 when arm 89 is in an inoperative position. To support a smaller record such as a 7″ record, arm 89 is rotated to the phantom line position shown in FIG. 12 and an edge of projection 91 engages with an edge of arm 86 to determine the proper position of arm 89.

Figure 13:
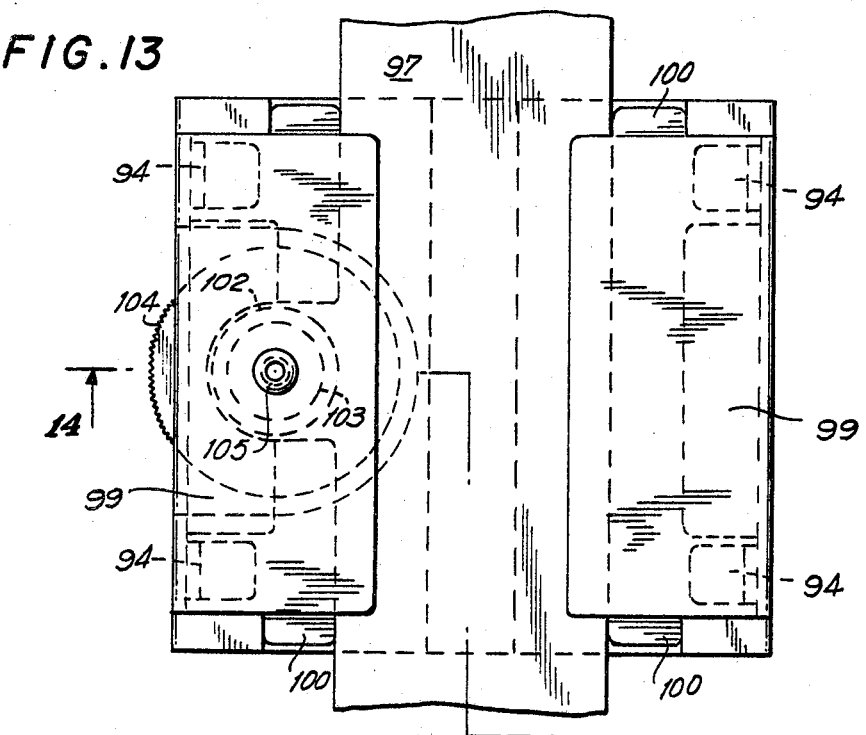
FIG. 13 is a partial top plan view of the counterweight support arrangement of the instant invention.
Figure 14:
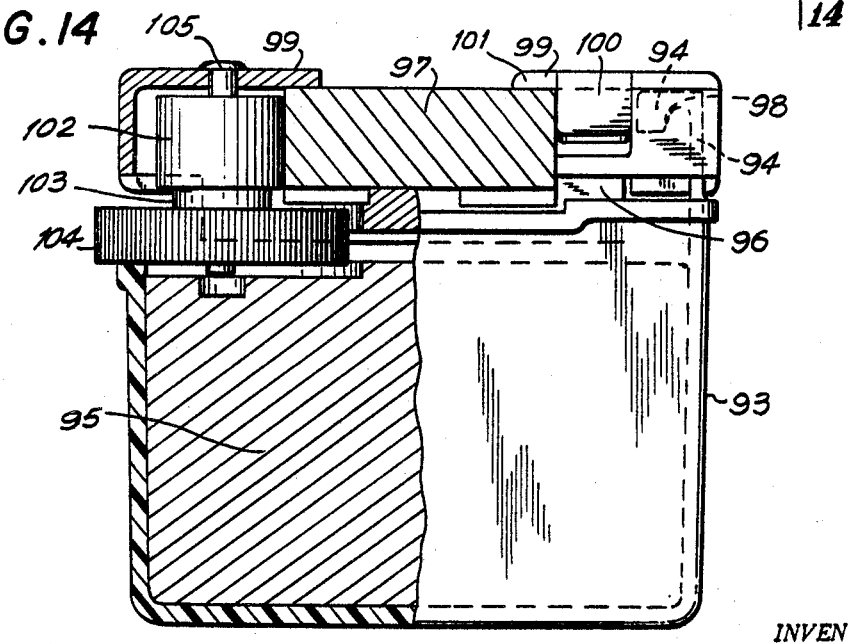
FIG. 14 is a sectional view taken along line 14—14 of FIG. 13.

Record changers and turntables are generally provided with counterbalancing means for setting the tracking pressure of the tone arm and cartridge assembly. Often, a counterweight for the tone arm is provided and the position of the counterweight is adjustable to either set the tracking pressure or balance the tone arm so that additional means may be utilized for setting the tracking pressure. An improved arrangement for supporting the counterweight and mounting it on the tone arm is shown in FIGS. 13 and 14.

A pouch 93 molded of plasticized polyvinyl chloride or other suitable resilient material is provided with four tongues 94 by which the pouch is suspended. Within the pouch is the counterweight 95 which, to give maximum mass at minimum volume is preferably cast of lead. A guide 96 is adapted to surround the tone arm 97 on three sides and is provided with four cut-outs 98 for receiving the ends of tongues 94. The tongues are held in position in cut-outs 98 by means of two clips 99 each of which has a pair of tabs 100 which secure the clips to guide 96. The clips also have extensions 101 adapted to overlie tone arm 97 whereby the clips and guide assembly surrounds the tone arm to provide a slidable connection to the tone arm. Counterweight 95 is suspended from the tone arm through the clips and guide assembly by means of tongues 94. The utilization of plasticized polyvinyl chloride or other suitable material provides a suspension of the counterweight from the tone arm which is resilient in all directions of relative movement between the tone arm and the counterweight.

In order to adjust the position of the counterweight on the tone arm, a friction drive wheel 102 surrounds a shaft 103 to which is fixedly connected a knurled wheel 104. Shaft 103 is rotatably mounted on a pin 105 secured to one of clips 99. When the counterweight assembly is mounted on tone arm 97, drive wheel 102, which may have a rubber or other suitable surface, frictionally engages a side of tone arm 97 to hold the counterweight assembly in position. By rotation of knurled wheel 104, drive wheel 102 may be rotated to adjust the position of the counterweight assembly along the tone arm.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a record changer the combination comprising a frame, a record support spindle supported by said frame, blade means arranged longitudinally of said spindle and pivotally mounted thereto, said blade means having a central position with respect to said spindle, and actuating means carried by said frame and cooperating with said blade means for moving said blade means in one direction from said central position for sequentially releasing records from said support spindle and for urging said blade means in the opposite direction beyond said central position for sensing the presence or absence of a record on said support spindle.

2. In a record changer the combination comprising a frame, a record support spindle supported by said frame, blade means arranged longitudinally of said spindle and pivotally mounted thereto, actuating means carried by said frame and cooperating with said blade means for moving said blade means in one direction for sequentially releasing records from said support spindle and for urging said blade means in another direction for sensing the presence or absence of a record on said support spindle, a switch mounted on said frame, and switch controlling means carried by said frame and operated by said actuating means for conditioning said switch controlling means for switch shut-off on completion of a record play cycle after said blade means senses the absence of a record on said support spindle.

3. A record changer as claimed in claim 2 including a support bracket mounted on said frame remote from said spindle and having a record support surface for receiving and supporting the edge of a record when supported on said spindle, said support bracket including a hold-down arm slidably supported for vertical movement in said support bracket and spring means biasing said hold-down arm downwardly into engagement with an edge of the top most record supported on said support brackets.

4. A record changer as claimed in claim 3 wherein said hold-down arm includes a vertically extending lever having a hold-down extension at one end and a pivot at the other end, a bell crank pivoted intermediate its ends to said frame and having one end pivoted to said other end of said vertically extending lever, said spring means acting between said bell crank and said frame, a link connected to the other end of said bell crank for actuating said hold-down arm, second spring means connected between said vertically extending lever and said bell crank, and pin and cam means carried by said support bracket and said vertically extending lever for guiding said vertically extending lever away from the edges of the records as said vertically extending lever is being raised and for guiding said vertically extending lever toward the edges of the records as said vertically extending lever is being lowered under the biasing of said spring means.

5. A record changer as claimed in claim 4 wherein the point of attachment of said second spring means to said vertically extending lever is on one side of a line between the pivot of said bell crank to said frame and the pivot of said vertically extending lever to said bell crank when said vertically extending lever is in said lowered position and wherein said point of attachment of said second spring means to said vertically extending lever is on the other side of said line when said vertically extending lever is in said raised position.

6. A record changer as claimed in claim 2 including a support bracket mounted on said frame remote from said spindle and having a record support surface for receiving and supporting the edge of a record when supported on said spindle, said support bracket including an arm pivoted to said frame, said arm having an end for receiving the edge of a record thereon, said arm being shiftable about said pivot for supporting records of different diameters, means on said frame for defining two positions of said arm corresponding to records of two different diameters, an extension pivoted at one end to said end of said arm and rotatable between a first position wherein said extension overlies said arm and to a second position wherein said extension is capable of supporting an edge of a record of a third diameter.

7. A record changer as claimed in claim 2 wherein said actuating means includes a drive gear, a gear wheel driven by said drive gear, a first cam on said gear wheel, a second cam on said gear wheel, a first lever pivoted to said frame and guided by said first cam, a second lever slidably mounted on said frame and guidable by said second cam, said second lever being in engagement with said blade means, operating means cooperating between said first and second levers, and control means on said second lever engageable with said switch controlling means.

8. A record changer as claimed in claim 7 wherein said operating means cooperating between said first and second levers comprises a pin on said first lever and an elongated slot in said second lever through which said pin extends.

9. A record changer as claimed in claim 7 wherein said second lever has a cam follower pin disposed opposite said second cam, said second cam having a surface portion corresponding to said switch shut-off conditioning position, and spring means biasing said cam follower toward said surface portion, the movement of said cam follower and second lever toward said surface portion being prevented when said blade means senses the presence of a record on said spindle.

10. A record changer as claimed in claim 7 wherein said switch controlling means includes a shut-off cam on said gear wheel, a switch plate pivoted to said frame and having a pin proximate to said shut-off cam, control means carried by said switch plate for cooperating with said control means on said second lever and means on said switch plate for actuating said switch.

11. In a record changer the combination comprising a frame, a shouldered record support spindle supported by said frame, blade means arranged longitudinally of said support spindle and pivotally mounted thereto so that one end of the blade means is positioned in the vicinity of said support spindle shoulder and the other end of the blade means extends from said support spindle, said blade means having a central position with respect to said spindle, and actuating means carried by said frame and cooperaitng with said other end of the blade means for moving the said one end of the blade means in one direction from said central position for sequentially releasing records from said support spindle shoulder and for urging said one end of the blade means in the opposite direction beyond said central position for sensing the presence or absence of a record on said support spindle shoulder.

References Cited

UNITED STATES PATENTS

| 2,803,465 | 8/1957 | Dobrogowski et al. | 274—10 |
|---|---|---|---|
| 3,072,411 | 1/1963 | Hultquist. | |
| 3,201,131 | 8/1965 | Ansar et al. | |
| 3,346,261 | 10/1967 | Kolomayets et al. | |
| 3,408,081 | 10/1968 | Dennis | 274—10 |

HARRY N. HAROIAN, Primary Examiner